United States Patent [19]

Jung

[11] Patent Number: 5,706,366

[45] Date of Patent: Jan. 6, 1998

[54] APPARATUS FOR ENCODING AN IMAGE SIGNAL HAVING A STILL OBJECT USING AN IMAGE WARPING TECHNIQUE

[75] Inventor: Hae-Mook Jung, Seoul, Rep. of Korea

[73] Assignee: Daewoo Electronics, Co., Ltd., Seoul, Rep. of Korea

[21] Appl. No.: 532,034

[22] Filed: Sep. 22, 1995

[30] Foreign Application Priority Data

Mar. 2, 1995 [KR] Rep. of Korea .................. 95-5863

[51] Int. Cl.$^6$ .................. G06K 9/36; G06K 9/46
[52] U.S. Cl. .................. 382/232; 348/413
[58] Field of Search .................. 382/232, 236, 382/242, 243; 348/384, 390, 397, 399, 400, 420, 425, 413, 409, 416; 358/430, 453, 464, 467, 433

[56] References Cited

U.S. PATENT DOCUMENTS

| | | | |
|---|---|---|---|
| 4,951,140 | 8/1990 | Ueno et al. | 348/413 |
| 5,237,410 | 8/1993 | Inoue | 348/409 |
| 5,251,028 | 10/1993 | Iu | 348/400 |
| 5,260,782 | 11/1993 | Hui | 348/416 |
| 5,475,501 | 12/1995 | Yagasaki | 358/426 |
| 5,533,140 | 7/1996 | Sirat et al. | 348/420 |

Primary Examiner—Leo Boudreau
Assistant Examiner—Wenpeng Chen
Attorney, Agent, or Firm—Pennie & Edmonds, LLP

[57] ABSTRACT

An apparatus for encoding an image signal having a still object generates a first encoded image signal by encoding a contour signal detected at a first encoding channel, the contour signal providing boundary information for tracing an object boundary in a video frame. The video frame is divided into a plurality of processing blocks with a predetermined identical size. Each of the processing blocks selectively coupled to an image reconstruction device or a second encoding channel in response to a control signal indicating whether or not a part of the object boundary exists in each of the processing blocks. The image reconstruction device generates reconstructed processing blocks based on the processing blocks applied thereto.

2 Claims, 4 Drawing Sheets

FIG. 3A

|  |  |  |  |
|---|---|---|---|
| $P_1(0)$ | $P_2(0)$ | $P_3(0)$ | $P_4(0)$ |
| $P_{12}(A)$ | $P_{13}(B)$ | $P_{14}(0)$ | $P_5(0)$ |
| $P_{11}(C)$ | $P_{15}(D)$ | $P_{16}(E)$ | $P_6(0)$ |
| $P_{10}(F)$ | $P_9(G)$ | $P_8(H)$ | $P_7(I)$ |

FIG. 3B

| A | B | B | B |
|---|---|---|---|
| A | B |   | E |
| C | D | E | I |
| F | G | H | I |

FIG. 4

| M$_1$(0,1) | M$_2$(0,1) | M$_3$(1,1) | M$_4$(2,1) |
|---|---|---|---|
| M$_{12}$(0,0) | | | M$_5$(1,1) |
| M$_{11}$(0,0) | | | M$_6$(0,1) |
| M$_{10}$(0,0) | M$_9$(0,0) | M$_8$(0,0) | M$_7$(0,0) |

FIG. 5

| A | B | B | B |
|---|---|---|---|
| A | B | E | E |
| C | F | D | I |
| F | G | H | I |

APPARATUS FOR ENCODING AN IMAGE SIGNAL HAVING A STILL OBJECT USING AN IMAGE WARPING TECHNIQUE

FIELD OF THE INVENTION

The present invention relates to an apparatus for encoding an image signal at a low bit-rate; and, more particularly, to an apparatus for encoding an image signal having a still object through the use of an image warping technique.

DESCRIPTION OF THE PRIOR ART

In a digitally televised system such as video-telephone, high definition television or teleconference system, a large amount of digital data is needed to define each image frame signal since each line in the image frame signal comprises a sequence of digital data referred to as "pixels". Since, however, the available frequency bandwidth of a conventional transmission channel is limited, in order to transmit the substantial amount of digital data therethrough, it is inevitable to compress or reduce the volume of data through the use of various data compression techniques especially in such low bit-rate image signal encoding systems as video-telephone and teleconference systems.

One of such methods for encoding image signals for a low bit-rate encoding system is the so-called object-oriented analysis-synthesis coding technique (see Michael Hötter, "Object-Oriented Analysis-Synthesis Coding Based on Moving Two-Dimensional Objects", *Signal Processing: Image Communication*, 2, 409–428(1990)).

According to the object-oriented analysis-synthesis coding technique, an input image signal, which has moving objects, is divided into the objects; and three sets of parameters for defining motion, contour and pixel data of each object are processed through different encoding channels.

In case of processing image data or pixels lying within a "still object", a transform coding technique for reducing only the spatial redundancies contained in the image data is mainly employed in the object-oriented analysis-synthesis coding technique. One of the most frequently used transform coding techniques for image data compression is a DCT (discrete cosine transform) based block transformation coding, which converts a block of digital image data, for example, a block of 8×8 pixels, into a set of transform coefficient data. This method is described in, e.g., Chen and Pratt, "Scene Adaptive Coder", *IEEE Transactions on Communications*, COM-32, No. 3, pp. 225–232 (Mar. 1984).

In the DCT based block transformation coding, a non-object region within a block is filled with either average pixel values or a mirror image of the object in the block, and then transformation is carried out.

Even though this method has the advantage of being able to utilize two-dimensional DCT blocks used in conventional methods (such as Joint Photographic Experts Group: JPEG, Moving Pictures Experts Group: MPEG, H.261 etc.), it also includes unnecessary or undesired data in the non-object region of the image, and is, therefore, inefficient from a data compression point of view.

SUMMARY OF THE INVENTION

It is, therefore, a primary object of the present invention to provide an apparatus for effectively encoding an image signal having a still object using an image warping technique, thereby improving the data compression efficiency thereof.

In accordance with the present invention, there is provided an apparatus for encoding an image signal in a video frame having a still object, wherein the image signal includes non-zero values assigned for pixels within the still object and zero values assigned for pixels outside thereof, which comprises: a contour detector for detecting a boundary of the object included in the video frame to generate a contour signal providing boundary information for tracing the object boundary; a contour coder for encoding the contour signal to generate a first encoded image signal; a block generator for dividing the video frame into a plurality of processing blocks with a predetermined identical size; a controller for generating a control signal indicating whether or not a part of the object boundary in the video frame exists in each of the processing blocks; a switching circuit for providing a first and a second sets of processing blocks in response to said control signal; an image reconstruction device for generating a reconstructed processing block based on the first set of processing blocks; an encoding channel for encoding the reconstructed processing block or the second set of processing blocks, to thereby produce a second encoded image signal; and a formatting circuit for formatting the first and the second encoded image signals.

BRIEF DESCRIPTION OF THE DRAWINGS

The above and other objects and features of the present invention will become apparent from the following description of preferred embodiments given in conjunction with the accompanying drawings, in which:

FIG. 3A presents an exemplary processing block including an object boundary;

FIG. 3B shows a boundary mapped processing block for explaining a boundary mapping process;

FIG. 4 provides a first set of displacement vectors corresponding to pixels on a block boundary; and FIG. 5 represents a reconstructed processing block produced by using the inventive image warping scheme.

DETAILED DESCRIPTION OF THE PREFERRED EMBODIMENTS

Figure 1:
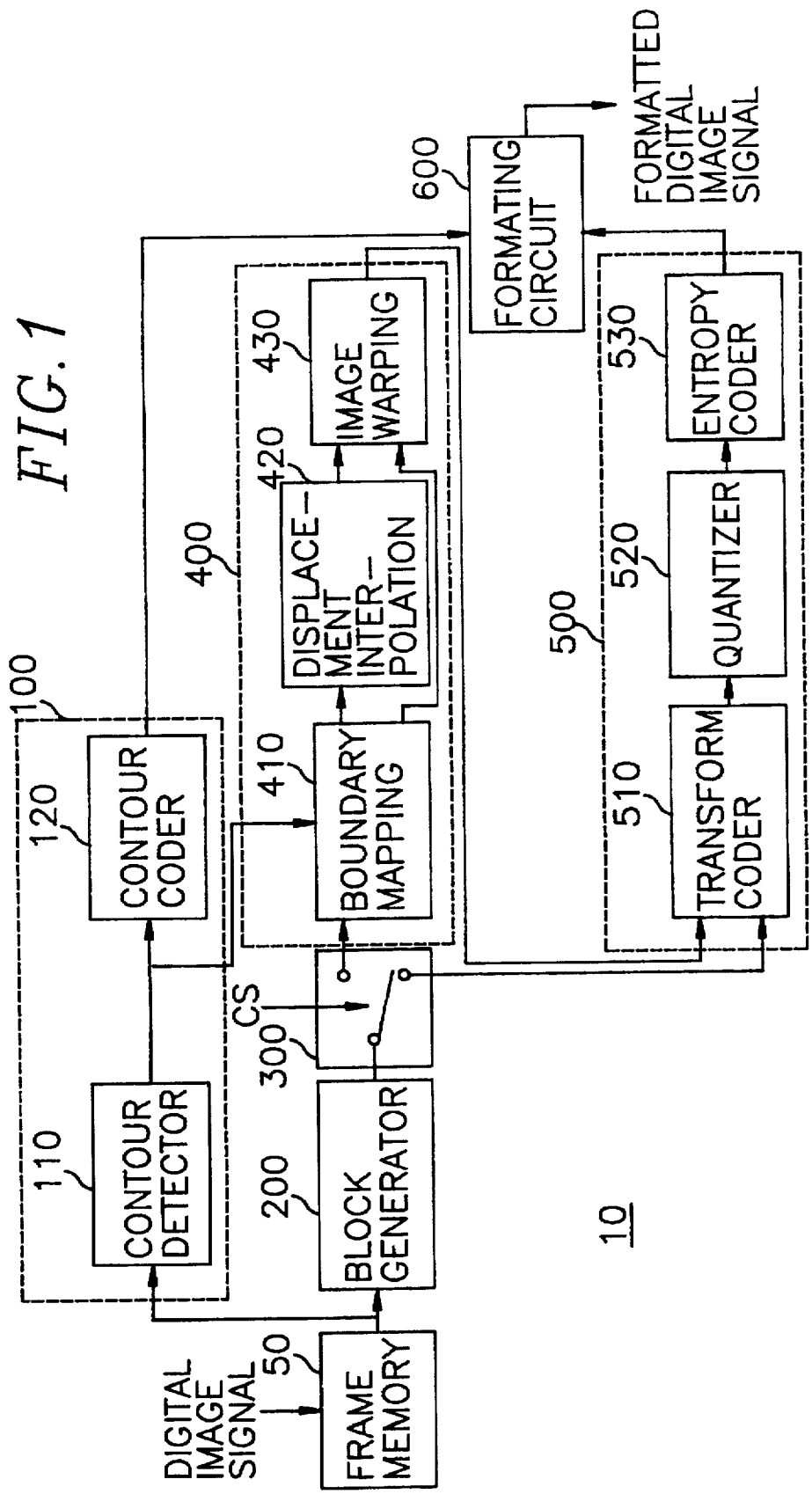
FIG. 1 is a block diagram illustrating an image signal encoding apparatus in accordance with the present invention.

Referring to FIG. 1, there is shown a block diagram of an inventive apparatus for encoding a digital image signal in a video frame. The encoding apparatus 10 comprises a first and a second encoding channels 100 and 500, and an image reconstruction device 400 for producing reconstructed processing blocks in order to effectively encode a portion of a boundary of an object in the video frame, wherein the first encoding channel 100 serves to encode a contour signal of the object and the second encoding channel 500 operates to encode the digital image data on a block-by-block basis.

The digital image signal, which is generated from a known image source(not shown), e.g., a hard disk or compact disk, is inputted to a frame memory 50 for the storage thereof. The digital image signal has a still object and includes non-zero values assigned to those pixels within the object and zero values assigned to the pixels outside thereof. The image signal from the frame memory 50 is then retrieved to a contour detector 110 in the first encoding channel 100 and a block generator 200.

Figure 2:
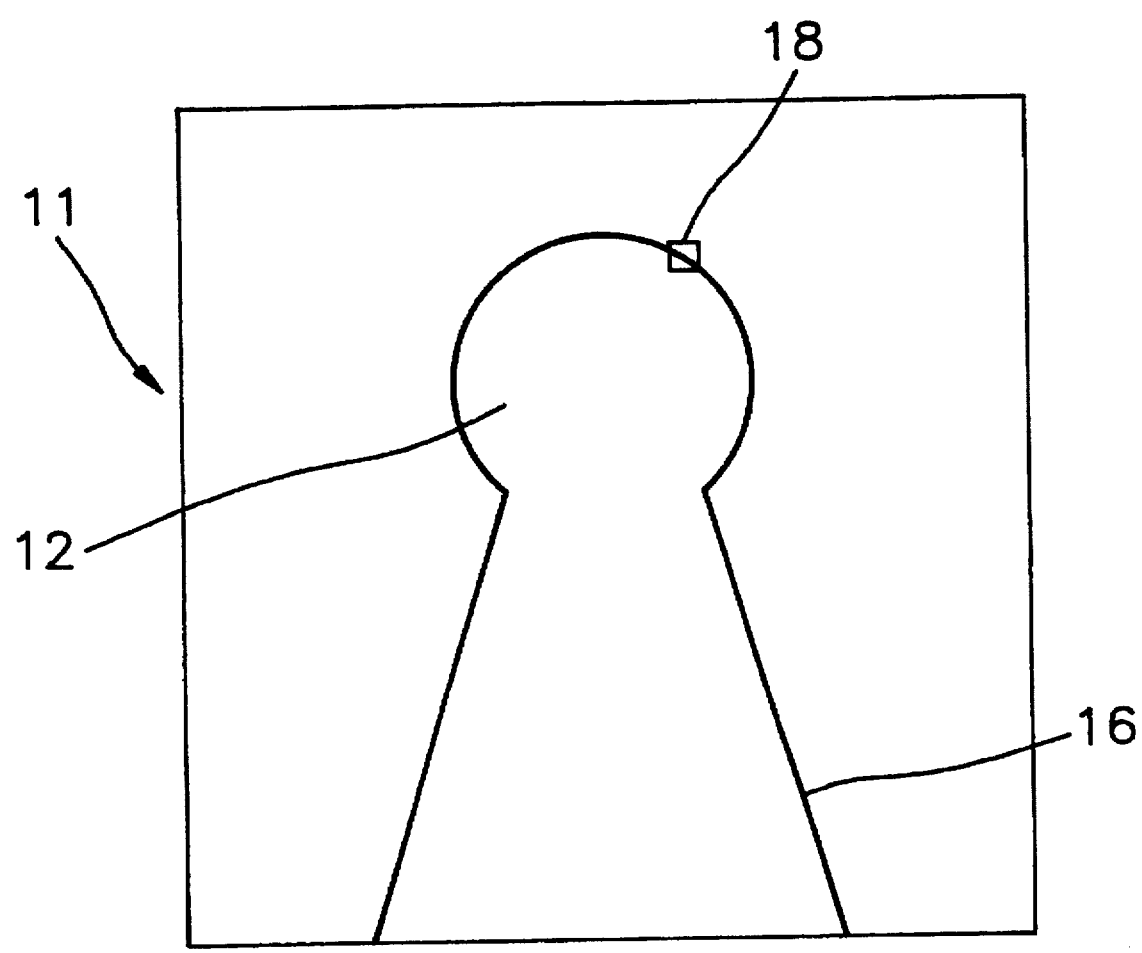
FIG. 2 depicts an exemplary video frame having a still object.

The first encoding channel 100, which includes the contour detector 110 and a contour coder 120, serves to detect and encode the contour signal of the object in the video frame from the frame memory 50 by employing a known contour detecting and coding technique to produce an encoded contour signal. More specifically, as illustrated in FIG. 2, the contour detector 110 detects a contour signal representing a contour 16 of an object 12 in the video frame 11 through the use of a known edge detection technique employing a known edge detection operator, e.g., a sobel operator. As well known in the art, the contour signal of the object can be derived from edge points defined as pixel locations at which a significant change occurs on a physical aspect of the image signal to form the object thereof. Such a change can be detected by comparing pixel values obtained from the values or gray levels of M×M, e.g., 3×3, pixels having a pixel to be detected with a predetermined threshold value, wherein the pixel to be detected is placed at the center of the M×M pixels. The contour signal detected at the contour detector 110 is then provided to the contour coder 120 for the encoding thereof.

At the contour coder 120, the contour signal from the contour detector 110 is encoded by using, e.g., a binary arithmetic code of JPEG(Joint Photographic Experts Group) and then the encoded contour signal is supplied to a formatting circuit 600.

In the meantime, the block generator 200 divides the video frame signal from the frame memory 50 into a multiplicity of processing blocks having an identical size of N×N pixels, N being an integer larger than 3, and provides the processing blocks to a switching circuit 300 on a block-by-block basis. At the switching circuit 300, each of the processing blocks from the block generator 200 is selectively coupled to the image reconstruction device 400 or the second encoding channel 500 in response to a control signal CS from a system controller(not shown). The system controller generates the control signal CS based on the contour information of the object in the video frame, the control signal CS indicating whether or not a part of the object boundary in the video frame exists in each of the processing blocks. If the part of the object boundary exists in a processing block, i.e., the control signal CS is a logic high, the processing block is coupled to the image reconstruction device 400 for generating a reconstructed processing block; otherwise, it is sent to the second encoding channel 500.

In accordance with the present invention, the image reconstruction device 400, which includes a boundary mapping section 410, a displacement interpolation section 420 and an image warping section 430, converts each of the processing blocks from the switching circuit 300 into the reconstructed processing block for improving a data compression efficiency at the second encoding channel 500.

As shown in FIG. 1, the contour signal including the contour information from the contour detector 110 is provided to the boundary mapping section 410. The boundary mapping section 410 assigns pixel values from a set of object boundary pixels lying on the object boundary to their nearest non-object regional block boundary pixels lying on a block boundary that does not form a part of the object and calculates displacements between the non-object regional block boundary pixels and the object boundary pixels corresponding to the non-object regional block boundary pixels, to thereby provide an image mapped processing block and a first set of displacement vectors for the block boundary pixels of each processing block.

Figures 3A, 3B:
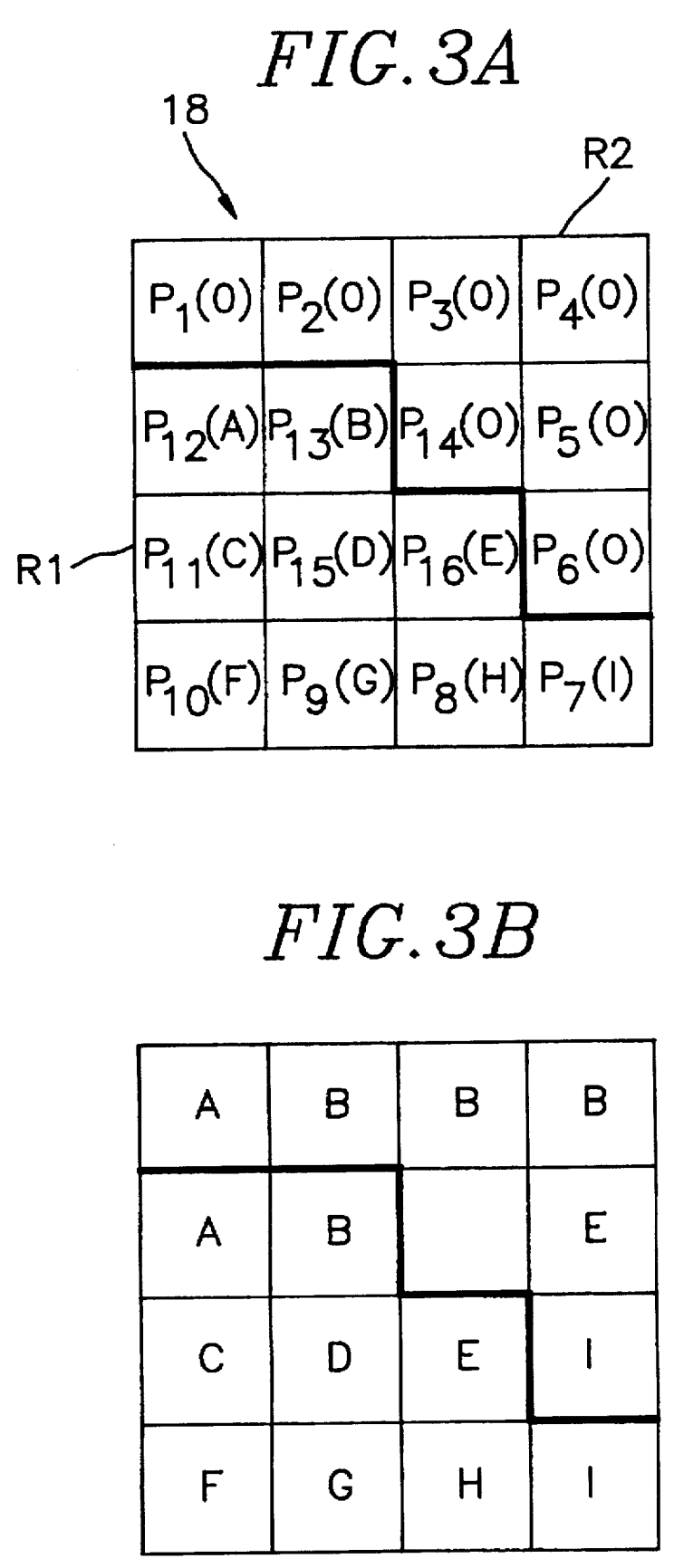

Referring to FIGS. 3A and 3B, an enlarged view of the processing block 18 shown in FIG. 2 and an exemplary image mapped processing block are illustrated. The processing block 18 having, e.g., 4×4 pixels $P_1$ to $P_{16}$ includes an object region R1 and a non-object region R2, wherein the numeral in each of the parentheses represents a pixel value for each pixel in the processing block 18, and the object-region has object boundary pixels $P_{12}$, $P_{13}$, $P_{16}$ and $P_7$. In order to determine the first set of displacement vectors for the block boundary pixels $P_1$ to $P_{12}$ of the processing block, object boundary pixel values A, B, E and I are assigned to the non-object regional block boundary pixels $P_1$ to $P_6$ in the R2 first, as shown in FIG. 3B. After assigning the object boundary pixel values to the non-object regional block boundary pixels in the R2, a displacement between each of the non-object regional block boundary pixels and its corresponding object boundary pixel is determined.

In a preferred embodiment of the present invention, determination of a unique value for each of the non-object regional block boundary pixels $P_1$ to $P_6$ is performed by assigning one of the object boundary pixel values having a higher priority thereto. The priority is given to the object boundary pixels having a minimum distance from a non-object regional block boundary pixel in the R2. If more than one object boundary pixels have a same minimum distance, priority will be given to the object boundary pixels in an ascending order of x-components of their displacements. For instance, $P_6$ has the same distance from two pixels $P_7$ and $P_{16}$ on the object boundary, the displacements from $P_7$ to $P_6$ and from $P_{16}$ to $P_6$ are (0,1) and (1,0), respectively. In a situation such as this, where the distances to a non-object regional block boundary pixel $P_6$ from two object boundary pixels $P_7$ and $P_{16}$ are the same, but the respective displacements from each of the two pixels are different, the pixel, i.e., $P_7$ that has the displacement with the smaller x-component receives higher priority.

Specifically, for a set of the non-object regional block boundary pixels $P_1$ to $P_6$ as illustrated in FIG. 3A, pixel value A of $P_{12}$ is assigned to $P_1$, pixel value B of $P_{13}$ to each of $P_2$, $P_3$ and $P_4$, pixel value E of $P_{16}$ to $P_5$, and the pixel value I of $P_7$ to $P_6$ and the image mapped processing block as shown in FIG. 3B is produced. The displacement vectors of non-object regional block boundary pixels $P_1$ to $P_6$ are (0, 1), (0, 1), (1, 1), (2, 1), (1, 1) and (0, 1) while the displacement vectors for the object regional block boundary pixels $P_7$ to $P_{12}$ in the R1 are all (0, 0). In FIG. 4, there is illustrated the first set of displacement vectors $M_1$ to $M_{12}$, wherein the numerals in the parentheses represent the x and y components measured from their corresponding object boundary pixels.

Referring back to FIG. 1, the first set of displacement vectors $M_1$ to $M_{12}$ and the image mapped processing block, generated from the boundary mapping section 410, are provided to the displacement interpolation section 420 and the image warping section 430, respectively. At the displacement interpolation section 420, a second set of displacement vectors for non-block boundary pixels that do not form a part of the block boundary of the processing block is generated by, e.g., linearly interpolating the first set of displacement vectors.

In the preferred embodiment of the present invention, displacement vectors for non-block boundary pixels are interpolated by the following method. First, Eq. 1 given below is used to calculate a displacement d(x, y) for a non-block boundary pixel:

$$d(x,y) = \frac{\sum_{i=1}^{12} \frac{1}{D_i} M_i}{\sum_{i=1}^{12} \frac{1}{D_i}} \quad \text{Eq. 1}$$

wherein, x and y are the horizontal and vertical components for the non-block boundary pixel, $D_i$ represents the distances between the non-block boundary pixel and each of the block boundary pixels, and $M_i$ represents the first set of displacement vectors for each of the block boundary pixels. Secondly, if x or y is not an integer, said non-integer component is rounded up to a nearest integer. In this manner, displacements for all of the non-block boundary pixels $P_{13}$ to $P_{16}$ shown in FIG. 3A are obtained and provided as the second set of displacement vectors to the image warping section 430 for generating the reconstructed processing blocks.

The image warping section 430 updates the pixel values for $P_{13}$, $P_{15}$ and $P_{16}$ in the object region R1 and assigns one of the pixel values in the R1 to $P_{14}$ in the R2 based on the second set of displacement vectors from the displacement interpolation section 420 and the pixel values from the image mapped processing block; and generates the reconstructed processing blocks to the second encoding channel 500. As shown in FIG. 5, if the second set of the displacement vectors for the non-block boundary pixels $P_{13}$ to $P_{16}$ are (0, 0), (0, 1), (1, 1) and (1, 0), the non-block boundary pixels $P_{13}$ to $P_{16}$ will be given B, E, F and D, respectively.

The second encoding channel 500, which includes a transform coder 510, a quantizer 520 and an entropy coder 530, serves to encode the image data included in each of the reconstructed processing blocks from the image warping section 430 in the image reconduction device 400 or a non-reconstructed processing block from the switching circuit 300 by using a conventional transform and statistical coding technique. That is, the transform coder 510 transforms the image data of each processing block in the spatial domain from the image warping section or a switching circuit 300 into a set of transform coefficients in the frequency domain by employing, e.g., a discrete cosine transform(DCT) and provides the set of transform coefficients to the quantizer 520. At the quantizer 520, the set of transform coefficients is quantized by using a known quantization method; and then the set of quantized transform coefficients is fed to the entropy coder 530 for further processing.

The entropy coder 530 encodes the set of quantized transform coefficients from the quantizer 520 for each of the non-reconstructed or reconstructed processing blocks by using, e.g., a combination of run-length and variable length coding to generate an encoded image signal. The image signal encoded by the entropy coder 530 is then provided to the formatting circuit 600.

The formatting circuit 600 formats the encoded contour signal from the contour coder 120 in the first encoding channel 100 and the encoded image signal from the entropy coder 530 in the second encoding channel 500, to thereby provide a formatted digital image signal to a transmitter(not shown) for the transmission thereof.

As demonstrated above, therefore, the present invention is capable of considerably reducing high frequency components present between the pixels within a still object and those pixels outside thereof during the coding process using the inventive image warping technique, thereby improving the overall coding efficiency.

While the present invention has been described with respect to the particular embodiments, it will be apparent to those skilled in the art that various changes and modifications may be made without departing from the spirit and scope of the invention as defined in the following claims.

What is claimed is:

1. An apparatus for encoding an image signal in a video frame having a still object, wherein the image signal includes non-zero values assigned for pixels within the still object and zero values assigned for pixels outside thereof, which comprises:

means for detecting a boundary of the object included in the video frame to generate a contour signal providing boundary information for tracing the object boundary;

means for encoding the contour signal to generate a first encoded image signal;

means for dividing the video frame into a plurality of processing blocks having a predetermined identical size;

means for generating a control signal indicating whether or not a part of the object boundary in the video frame exists in each of the processing blocks;

means for providing a first and a second set of processing blocks in response to the control signal, said first set of processing blocks comprising those blocks containing a part of the object boundary, and said second set of processing blocks comprising those blocks not containing a part of the object boundary;

means for generating a reconstructed processing block based on the first set of processing blocks;

means for encoding the reconstructed processing block or the second set of processing blocks, to thereby produce a second encoded image signal; and means for formatting the first and the second encoded image signal, wherein said means for generating a reconstructed processing block comprises:

means for assigning values of each of a plurality of non-object block boundary pixels of each processing block in the first set, based on a value of a corresponding nearest object boundary pixels in that processing, thereby creating an image mapped processing block;

means for calculating a first set of displacement vectors representing distances from each of said non-object block boundary pixels whose values had been assigned, to its corresponding nearest object boundary pixel; and means for updating values of each of a plurality of non-block boundary pixels in the image mapping processing block based on said first set of displacement vectors.

2. An apparatus for encoding an image signal in a video frame having a still object, wherein the image signal includes non-zero values assigned for pixels within the still object and zero values assigned for pixels outside thereof, which comprises:

means for detecting a boundary of the object included in the video frame to generate a contour signal providing boundary information for tracing the object boundary;

means for encoding the contour signal to generate a first encoded images signal;

means for dividing the video frame into a plurality of processing blocks having pedetermined identical size;

means for generating a control signal indicating whether or not a part of the object boundary in the video frame exists in each of the processing blocks;

means for providing a first and a second set of processing blocks in response to the control signal;

means for generating a reconstructed processing block based on the first set of processing blocks;

means for encoding the reconstructed processing block or the second set of processing blocks, to thereby produce a second encoded image signal; and means for formatting the first and the second encoded image signal;

wherein said reconstructed processing block generating means includes:

means for assigning the pixel values from a set of object boundary pixels lying on the object boundary to their nearest non-object regional block boundary pixels lying on a block boundary that does not form a part of the object based on the contour information of the object in the video frame and calculating displacements between the non-object regional block boundary pixels and the object boundary pixels corresponding thereto, to thereby generate a first set of displacement vectors and an image mapped processing block;

means for generating a second set of displacement vectors for non-block boundary pixels that do not form a part of the block boundary of each of the first set of processing blocks by linearly interpolating the first set of displacement vectors; and means for generating the reconstruction processing block based on the first set of displacement vectors and the image mapped processing block data.

* * * * *